Jan. 10, 1956

D. A. WALKER 2,729,930

COTTON DOFFER

Filed Jan. 17, 1955

INVENTOR
DELOS A. WALKER

Paul O. Pippel

ATTORNEY

United States Patent Office 2,729,930
Patented Jan. 10, 1956

2,729,930

COTTON DOFFER

Delos A. Walker, Memphis, Tenn., assignor to International Harvester Company, a corporation of New Jersey Application January 17, 1955, Serial No. 482,130

10 Claims. (Cl. 56—41)

This invention relates to doffers for removing cotton from the spindles of cotton picker machines and more particularly is directed to an improvement in the doffer disk.

This invention is an improvement of the assembly shown in U. S. Patent 2,700,266 issued January 25, 1955 wherein there is shown an arrangement which comprises a doffer disk with radially extending fingers each of which supports a doffing lug on its outer extremity. While this construction has proved feasible and has been an improvement over previous doffers, nevertheless, it has been found to be subject somewhat to the limitations of doffer assemblies of similar construction in that the limited flexibility of the doffer support would preclude absolute conformance of doffer action to the operating conditions.

The general object of the invention is to provide an improved doffer assembly wherein the doffer lugs are supported and entirely isolated from the rigid structure of the supporting disk so as to obtain universal angling of the doffer lug and thus provide a free floating action for the lug to meet the varying conditions that are being continually encountered thereby in brushing the cotton and other debris from the spindles.

A more specific object of the invention is to provide a doffer which includes a support structure in the form of a disk having radially outwardly extending fingers, the spaces between the fingers being bridged by rubber-like material which is secured thereto and carrying doffer lugs between the fingers to thereby obtain axial and circumferential deflection of the doffer lugs.

These and other objects of the invention will become more apparent from the specification and the drawings wherein.

Figure 1:
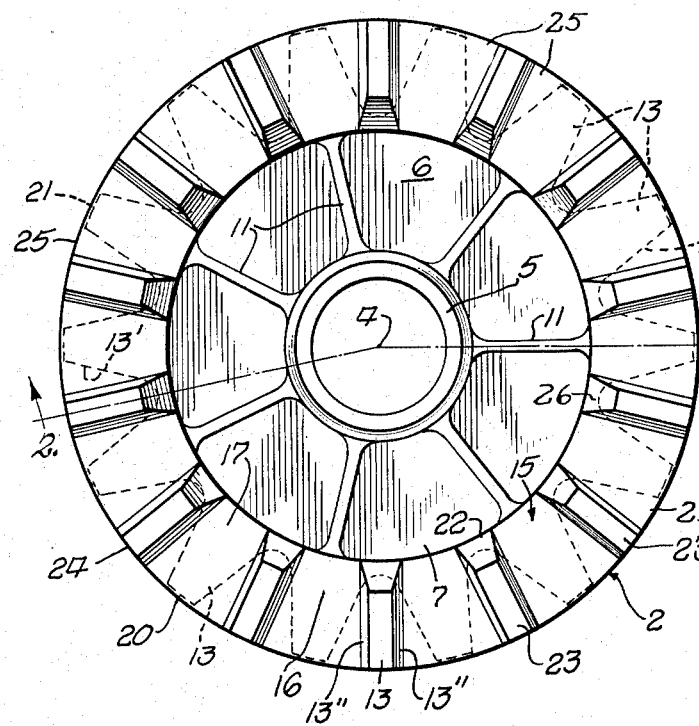
Figure 1 is a bottom plan view of the novel doffer disk assembly.

Describing the invention in detail, the doffer assembly generally designated 2 comprises a disk-like carrying unit or support structure 3 formed symmetrically about a principal axis 4, seen as a point in Figure 1. The unit 3 may be formed of aluminum, although it may be made of flexible material, such as a plastic or even steel. During the operation of the entire doffer assembly 2, it is caused to rotate about the axis 4.

Figure 2:
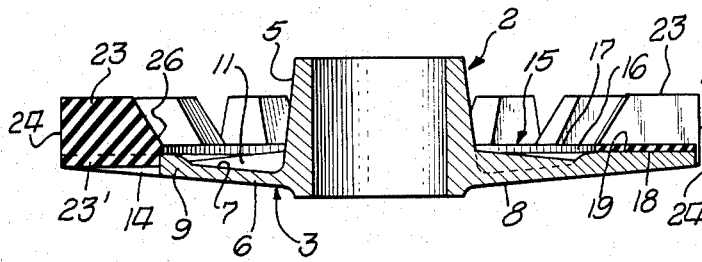
Figure 2 is a radial sectional view taken substantially on the line 2—2 of Figure 1.

The disk-like unit 3 comprises a central generally cylindrical hub 5 extending axially of the unit concentric with the axis 4, and the hub intermediate its ends is formed integral with the inner periphery of a circumscribing plate portion 6 concentric with the axis 4. A plate portion 6 is preferably dished axially and provides a concave reverse side 7 which is generally the bottom and a convex obverse side 8 which is generally the top. The outer periphery of the plate portion 6 is thickened as indicated at 9 (Fig. 2) and the plate is interconnected with the hub on the side 7 by means of a plurality of radially elongated axially projecting ribs 11. The support structure 3 is provided about its outer periphery with a plurality of equally spaced outwardly projecting fingers 13 integral with plate portion 6 and positioned in a common plane substantially perpendicular to the axis 4 and tapered at their lateral edges 13' toward their outer extremities. Adjacent fingers thus defined V-shaped slots 14 therebetween with the apex of the V directed radially inwardly of the support unit 3.

An integral unit 15 of elastomer material, comprising an annular wafer-like web 16 with an obverse face 17 and a reverse face 18, has said reverse face 18 bonded or vulcanized to one side, the bottom 19, of the fingers 13. The web 16 is disposed concentric with the axis 4 and has its outer perimeter 20 approximately coincident with the outer or free extremities 21 of the fingers 13 and the inner perimeter 22 of the web is disposed slightly inwardly of the root portions 22' of the fingers in their area of juncture with the thick portions 9 about the outer periphery of the center plate 6.

The feature of the instant invention is in the provision of doffing means in the form of lugs or pads 23 which are integral with the ring 16 and project axially outwardly from the obverse face 17 of the web 16 and are disposed in substantially centered relationship to the spaces 14 approximately medially between the adjacent edges 13' of the successive fingers 13. Each lug 23 has lateral sides 13'' spaced circumferentially of the opposed edges 13'. It will be observed that the outer extremities 24 of the lugs or pads 23 are generally coincident with the outer periphery 20 of the web 16 and are entirely free from metal backing and entirely supported by the contiguous portions 25 of the ring 16 which bridges or spans the related space 14. Interlocking lugs 23' extend upwardly from the reverse face of the elastomer unit and each is complemental to the related slot 14 and extends thereinto and is bonded on its edges to the edges 13' of the fingers. It will be appreciated that each lug is thus accommodated axial movement relative to the support structure and at the same time is allowed to yieldably cant circumferentially of the doffer.

The inner extremity 26 of each doffer lug 23 is disposed in axial registry with the metal backing portion 27 of the support between the root ends of adjacent fingers 13. Thus what has been achieved is a doffer construction wherein the outer ends of the doffing pads or lugs are free floating and the inner ends are somewhat more restricted in their action. However, it has been discovered that it is the outer corners or extremities which break off and require the excess flexibility and at the same time sufficient rigidity must be provided at the inner extremities in order to prevent the operator from setting the doffers too low and actually bowing the portions 25 upwardly by pressing the lugs too hard on the spindles.

Figure 3:
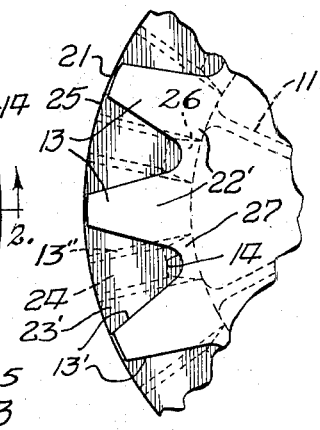
Figure 3 is a fragmentary plan view of the disk assembly of Figures 1 and 2.
Figure 4:
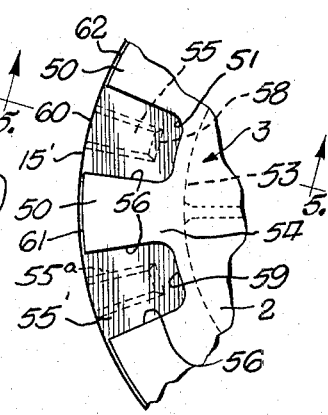
Figures 4 and 5 are fragmentary views showing a modification of the invention, Figure 4 being a top plan view and Figure 5 being a radial sectional view taken substantially on the line 5—5 of Figure 4.
Figure 5:
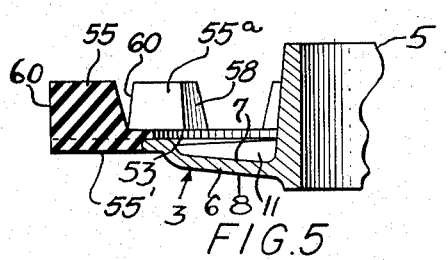

Figures 4 and 5 show a modification of the invention and like parts to those described in the previous embodiment are indicated by corresponding reference numerals. The support structure 3 of the doffer assembly 2 is substantially the same as that shown in Figures 1 to 3 with the exception that the fingers 50 are of slightly different construction than the fingers 13. In the present embodiment the fingers 50 define slots 51 therebetween which are somewhat U-shaped in plan. The doffing unit 15' which is formed of elastomer material has a circular web slightly in excess of the length of the fingers 50 and has its inner perimeter 53 inwardly of the root ends 54 of the fingers and the doffer lugs 55, which are integral with the web, have a radial length less than the depth of the slot or cut-out 51. Each lug 55 has side edges 55a circumferentially spaced from and centered between the adjacent side edges 56 of the consecutive fingers 50 and has an inner extremity 58 which is spaced radially outwardly of the bight portion 59 of the slot and has an outer extremity 60 which is substantially coincident with the outer periphery 61 of the wafer or ring 15′. The wafer has lugs or projections 55′ on the obverse or top side which are complemental to the respective slots 51 and bonded along their edges to the edges 56 and 59 of the slot. It will be noticed that the fingers 50 generally broaden out toward their outer extremities 62.

In the present instance it can be seen that the lug 55 is entirely free floating in every direction and is absolutely isolated from the metallic fingers, or rigidifying portions of the support, which of course may not be metal, and it is therefore free floating in every direction on the rubber-like material.

It will be understood that the elastomer units in both embodiments can be formed of natural rubber, synthetic rubber-like materials, or a blend of these two materials. The material from which the units are made all possess characteristics of soft vulcanized rubber having a resistant displacement and elasticity approximating that of thread projections on conventional automobile tires.

The instant inventions have been actually tested and whereas previous doffers gave a maximum of about 90 hours of service, the above-described doffer units according to latest reports have reached 400 hours or entire season of use and are still considered serviceable.

What is claimed is:

1. A doffer assembly comprising a plate-like unit for rotation about a principal axis thereof, and having a plurality of circumferentially spaced radially outwardly extending fingers disposed in a plane substantially perpendicular to said axis; an integral unit of elastomer material comprising an annular wafer-like web having an obverse face and a reverse face and connected at said reverse face to said fingers; said fingers defining slots therebetween; and a plurality of lugs integral with said web and projecting axially from said obverse face thereof and disposed in substantially centered relation to each slot and having side edges spaced circumferentially from respective fingers.

2. A doffer assembly according to claim 1 and further characterized in that said web has axial projections on its reverse face complemental to and extending into respective slots.

3. The invention according to claim 1 and further characterized in that each lug has an inner extremity; and said plate-like unit has an outer peripheral edge portion disposed in backing relation to said inner extremity of the lug.

4. The invention according to claim 1 and further characterized in that each lug has a radially inner extremity and the related slot has an inner edge spaced radially inwardly of said inner extremity of said lug whereby the lug is yieldably supported entirely by said web.

5. A doffer assembly comprising a carrier for rotation about a principal axis thereof and including a plurality of outwardly extending fingers spaced circumferentially about said axis and defining a plurality of slots therebetween; and doffer means formed of elastomer material connected to said fingers and including an axially extending lug in axial registry with each slot and said material having lug-sustaining portions spanning the space between said fingers and connected thereto, and each lug spaced circumferentially from the adjacent fingers.

6. The invention according to claim 5 and a boss extending into the related slot from each said material portion between the related fingers and secured thereto.

7. The invention according to claim 6 and each boss formed and arranged and fitting complementally into the related slot.

8. The invention according to claim 6 and each lug elongated radially of said doffer assembly; and having an inner edge disposed radially outwardly of the inner margin of the associated slot.

9. The invention according to claim 6 and said fingers being widened in a radially outward direction.

10. A doffer assembly comprising a carrier for rotation about a principal axis thereof and including a plurality of outwardly extending fingers spaced circumferentially about said axis, and doffer means formed of rubber-like material comprising a ring concentric with said axis and connected to all of said fingers, and doffing means connected to and disposed in registry axially of the doffer with the spaces between said fingers, and each doffing means spaced circumferentially from the fingers whereby said ring alone supports said doffing means.

References Cited in the file of this patent

UNITED STATES PATENTS

| | | |
|---|---|---|
| 2,654,203 | Parkerton | Oct. 6, 1953 |
| 2,700,266 | Walker | Jan. 25, 1955 |